United States Patent
Delia et al.

(10) Patent No.: US 8,055,905 B2
(45) Date of Patent: Nov. 8, 2011

(54) GRAPHICAL PASSWORD AUTHENTICATION BASED ON PIXEL DIFFERENCES

(75) Inventors: Wayne M. Delia, Poughkeepsie, NY (US); Edward E. Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 12/193,854

(22) Filed: Aug. 19, 2008

(65) Prior Publication Data

US 2010/0050242 A1 Feb. 25, 2010

(51) Int. Cl.
*G06F 21/00* (2006.01)
(52) U.S. Cl. .......................................... 713/184; 726/5
(58) Field of Classification Search ....... 726/5; 713/184
See application file for complete search history.

(56) References Cited

U.S. PATENT DOCUMENTS

| | | | |
|---|---|---|---|
| 2001/0037468 A1 | 11/2001 | Gaddis | |
| 2003/0053662 A1* | 3/2003 | Evoy et al. | 382/115 |
| 2004/0047489 A1* | 3/2004 | Seo et al. | 382/100 |
| 2004/0153649 A1* | 8/2004 | Rhoads et al. | 713/176 |
| 2005/0010785 A1 | 1/2005 | Abe et al. | |
| 2005/0144444 A1 | 6/2005 | Hall et al. | |
| 2006/0023921 A1* | 2/2006 | Saitoh et al. | 382/115 |
| 2006/0045361 A1* | 3/2006 | Yokose | 382/232 |
| 2007/0118737 A1* | 5/2007 | Shimizu | 713/156 |
| 2007/0192615 A1 | 8/2007 | Varghese et al. | |
| 2007/0226784 A1 | 9/2007 | Ueda et al. | |
| 2009/0293119 A1* | 11/2009 | Jonsson | 726/19 |

OTHER PUBLICATIONS

A Secure Image Authentication Algorithm with Pixel-Level Tamper Localization; J. Wu, B. Zhu, S. Li, F. Lin; 2004 International Conference on Image Processing 2004, ICIP '04, vol. 3, pp. 1573-1576, Oct. 2004.

Authentication Using Graphical Passwords: Effects of Tolerance and Image Choice, S. Wiedenbeck, J. Birget, A. Brodskiy, N. Memon, Proceedings of the 2005 Symposium on Usable Privacy and Security ACM International Conference Proceeding Series, vol. 93, pp. 1-12, 2005.

Pattern Based Data Hiding for Binary Image Authentication by Connectivity Preserving, H. Yang, A. Kot, IEEE Transactions on Multimedia, vol. 9, No. 3, Apr. 2007.

\* cited by examiner

*Primary Examiner* — Eleni Shiferaw
*Assistant Examiner* — Tamara Teslovich
(74) *Attorney, Agent, or Firm* — Ronald A. Kaschak, Esq.; Blanche E. Schiller, Esq.; Heslin Rothenberg Farley & Mesiti P.C.

(57) ABSTRACT

A password, unknown to a user to be authenticated by the password, is created by comparing an image provided by the user to a master image. Random differences between the images are found and used to create the password. The password is then validated to determine whether the user is authorized and/or to determine whether a communication provided by the user is to be processed.

20 Claims, 6 Drawing Sheets

Prior Art

GRAPHICAL PASSWORD AUTHENTICATION BASED ON PIXEL DIFFERENCES

TECHNICAL FIELD

This invention relates, in general, to the use of passwords, and in particular, to protecting passwords and facilitating creation and use thereof.

BACKGROUND OF THE INVENTION

Passwords are used in many situations in which authentication of a user is desired or needed. As examples, passwords are used when logging into computing systems, in using credit/debit cards, in communicating electronically, in electronic transactions, in locking/unlocking locks, etc.

There are various types of passwords, including those that are keyed-in and those that are graphical in nature. Passwords that are keyed-in are susceptible to being mistyped, and often, passwords, regardless of type, are forgotten. Passwords must also be protected.

The protection of passwords has become increasingly more difficult. Clever techniques have been created to discover a user's password. For example, key logging programs, which are difficult to detect with anti-virus programs, have been developed that capture every key stroke that is entered through a keyboard. This leaves the user's password vulnerable.

Even graphical passwords are vulnerable to screen shots and/or video display of the graphic images that have been entered.

SUMMARY OF THE INVENTION

Based on the foregoing, a need exists for a capability that improves password protection and facilitates the use of passwords. In particular, a need exists for an improved password authentication capability, including improved password creation and/or validation.

The shortcomings of the prior art are overcome and additional advantages are provided through the provision of a method of creating passwords. The method includes, for instance, obtaining, by a processing unit, an image; and creating a password based on the obtained image, wherein the creating includes, for instance, comparing, by the processing unit, the obtained image with another image to determine one or more random differences between the obtained image and the another image; and combining the one or more random differences determined from comparing the obtained image and the another image to create the password.

Systems and article of manufacture relating to one or more aspects of the present invention are also described and claimed herein. Further, services relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, an authentication capability is provided, in which a graphical password is dynamically created and used for authentication. The password is created by a comparison of images, instead of being typed in or otherwise provided by a user, etc. As one example, the comparison yields one or more differences (e.g., random pixel differences) and those differences encompass the password. The size of the password is based on the number of differences.

Figure 1:
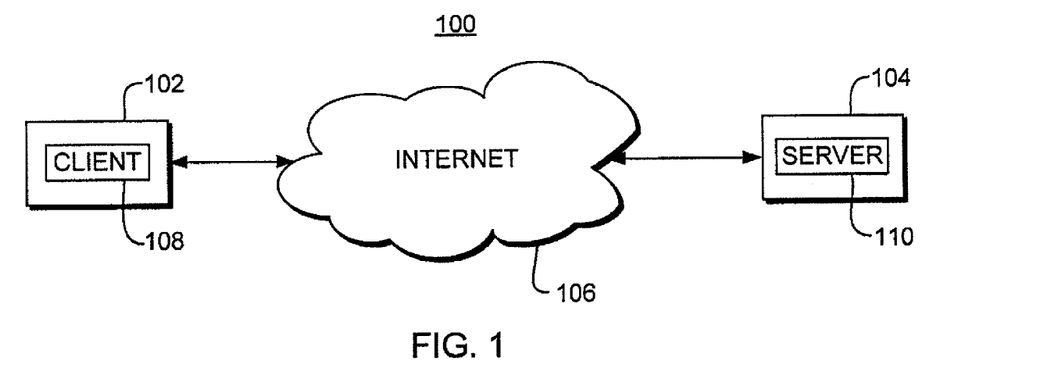
FIG. 1 depicts one example of a processing environment incorporating and using one or more aspects of the present invention.

Such a password may be created and used in a number of processing environments, including, but not limited to, client/server environments. One example of a client/server environment incorporating and using one or more aspects of the present invention is depicted in FIG. 1. As shown, a client/server environment 100 includes, for example, a processing unit 102 coupled to a processing unit 104 via an internet connection 106. Processing unit 102 includes a client application 108 (a.k.a., a client) and processing unit 104 includes a server application 110 (a.k.a., a server). Each processing unit 102, 104 includes, for instance, a personal computer, a laptop, a workstation, a mainframe, a mini-computer, or any other type of processing unit or device that uses passwords. As an example, any commercially available processing unit may be used. Processing unit 102 may or may not be the same type of unit as processing unit 104. In this example, the processing units are coupled via the internet. However, in other examples, they are coupled by other types of connections, including, but not limited to, wire connections or any type of network connections, such as a local area network (LAN), a wide area network (WAN), a token ring, an Ethernet connection, etc.

Although the example described herein includes a client/server environment, in other embodiments, other environments may include one or more aspects of the present invention. For example, an environment may include only one processing unit. Further, an environment may include more than two processing units and one or more of the connections may be other than the internet. Many other examples are also possible.

In the example described herein, a client forwards a communication to the server and that communication includes an image. The image is used to create the password, which is validated. If the password is approved, the communication is processed. Otherwise, the communication is not processed. There are many types of communications that include passwords and may benefit from one or more aspects of the present invention. One such communication is a transaction (e.g., an online transaction) to be processed, as described with reference to FIG. 2. In this particular example, the communication is a transaction forwarded by a client to a server to be processed by the server.

Figure 2:
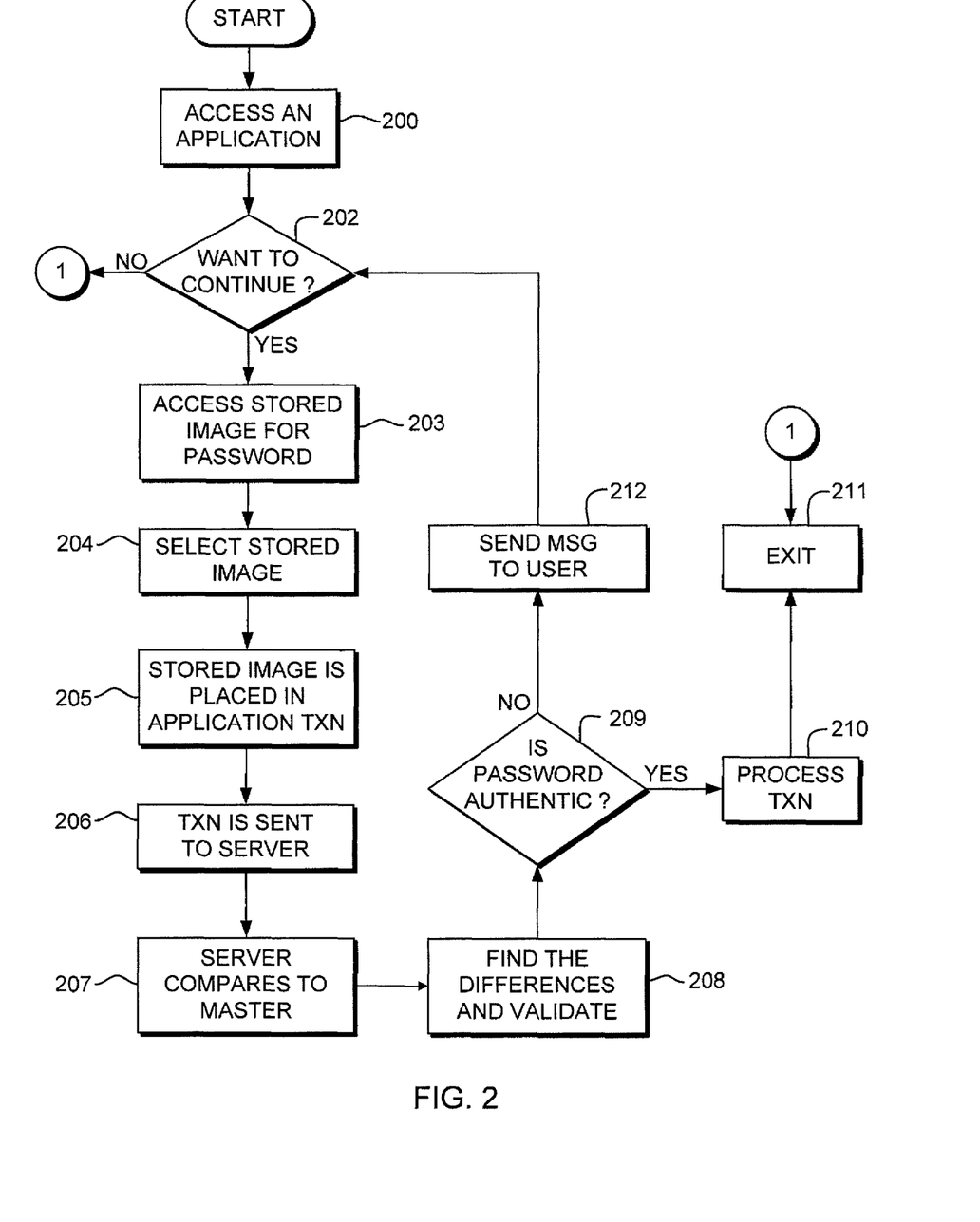
FIG. 2 depicts one embodiment of the logic to create and validate a password, in accordance with an aspect of the present invention.

Referring to FIG. 2, initially, a user at the client accesses an application, such as a web application, to be processed, STEP 200. A determination is made as to whether the user wishes to continue, INQUIRY 202. Assuming the user wishes to continue, the user accesses a stored image which is to be used for the password, STEP 203. This image is similar to a master image, but has one or more random pixel differences. The stored image is selected, STEP 204, and placed in a transaction built by the application, STEP 205. The transaction is then sent to the server to be processed, STEP 206.

In response to receiving the transaction, the server compares the image in the transaction to the master image, STEP 207. As an example, each pixel in the image in the transaction is compared to each pixel in the master image at the server. The comparison finds the differences between the two images and those differences are used to create the password. In particular, as one example, the password is a concatenation, in order of differences found, of the bits representing the pixels that are different in the image included in the transaction.

Subsequent to creating the password, the password is validated, STEP 208. In one example, this validation includes comparing the password to a list of passwords. If the password is authentic, INQUIRY 209, then the transaction is processed, STEP 210, and the logic is exited, STEP 211. However, if the password is not authentic, then, in one example, a message is sent to the user, STEP 212, and processing continues with INQUIRY 202. In this case, if the user does not want to continue by selecting a new image, processing is exited, STEP 211.

In the above logic, a stored image at the client is accessed for the password. One embodiment of creating this image is described with reference to FIG. 3. Initially, a master image file is selected (or created), STEP 300. Then, a new image is constructed by copying the master image file and changing one or more pixels of the copied image, STEP 302. In one example, a randomizing function is used to change the desired number of pixels. The number of pixels changed indicates the size of the password. For instance, if ten pixels are changed, then the password is ten bytes in length. To randomly select the pixels to change, the system has as input a number corresponding to the number of pixels to change, a desired randomizing function and a seed to begin the randomizing function. In one example, the selected randomizing function is to have enough range to cover the locations of the pixels in the image. There are many randomizing functions available or can be easily created in various programming languages, including, but not limited to, C++ and Java™. (Java is a trademark of Sun Microsystems, Inc.) The seed can be, for instance, time of day to the microsecond or any other desired seed. In this example, if ten pixels are to be changed, then ten seeds are chosen.

Figure 3:
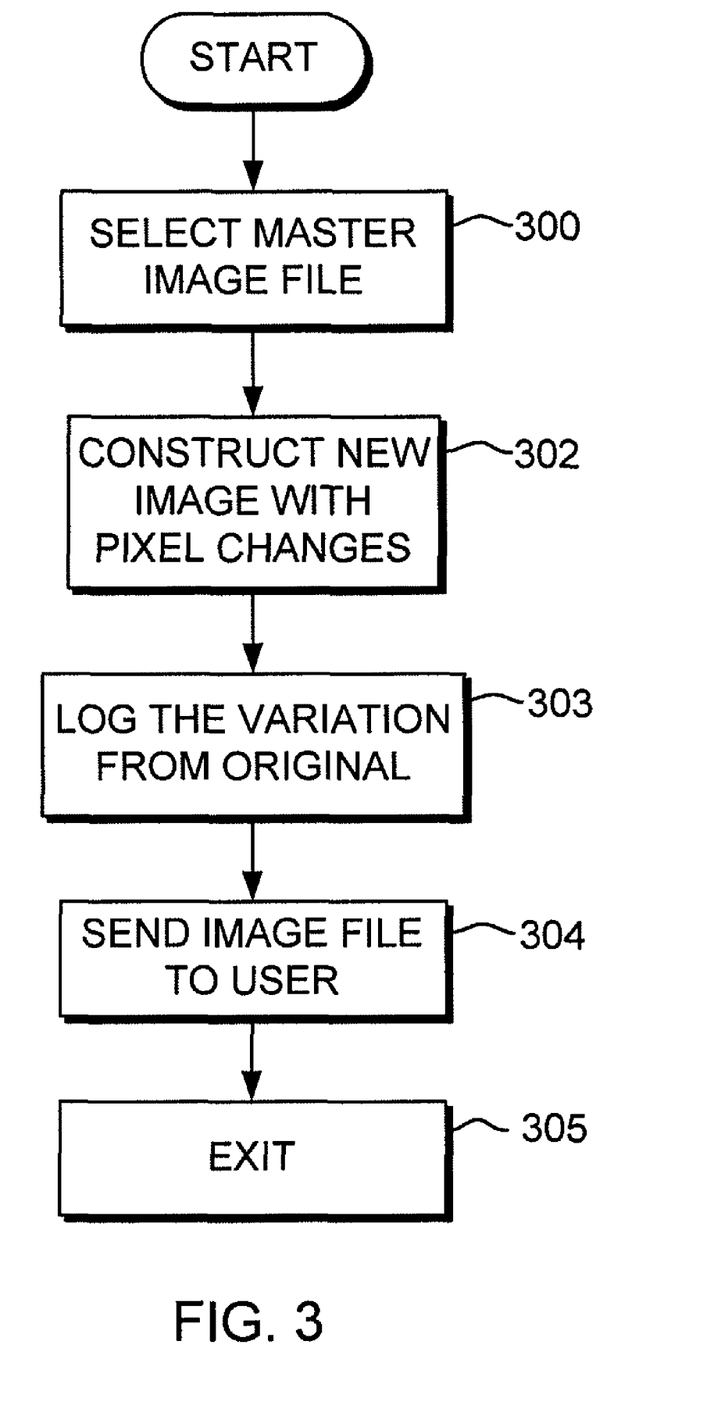
FIG. 3 depicts one embodiment of the logic to create an image from which a graphical password is created, in accordance with an aspect of the present invention.

Thereafter, the variation is logged, STEP 303. For instance, the pixel locations and pixel values of the changed pixels, and the master image name are logged. The new image is then forwarded to the user for storage and inclusion in the communication (e.g., transaction), STEP 304. This concludes processing, STEP 305.

Described in detail above is a capability in which authentication is accomplished by comparing a master image file, such as a master JPG file, stored on a server of a secure transaction service provider, with a very similar image issued to a registered client of the secure transaction service provider. The client image file appears to be very similar to the master image file, with the difference of the values of a selected number of pixels within the images. The different byte values of the pixel cells are known to the secure system. When account authorization is required or desired, the client image is presented and transmitted to the secure server, where the bit-wise differences are analyzed. If the correct image is sent to the secure server, which has the exact pixel differences corresponding to the known differences when the account was registered, then the secure transaction can take place. This authentication capability does not require typing in a text password that can be intercepted by a key logger, nor does it require selecting a sequence of graphical elements which can be acquired by eavesdropping or capturing screen shots. Rather, this form of authentication depends on the presence of known precise subtle differences and pixel information between two otherwise very similar image files. Transmitting a stored image file with differences in pixel information removes the need to remember a text password or particular sequence of image selections as a means to obtain authentication.

In one example, the graphical password is invisible to the user. The user sees an image, but it is not known to the user what the actual password is. The pixel differences, which are known to the server, are randomly selected. The use of such a digital image/password facilitates authentication of a user, such as to an operating system, application system or any other type of system. By using digital images, the user is able to avoid entry of a text password. Further, there is no dependency on encryption or decryption. A graphical password authentication capability is implemented that is based on known (e.g., to the server, not user) minor pixel differences which enables enhanced security when authenticating a user (e.g., to an internet on-line form or other program, system, device, etc.). The user is not storing, saving or remembering a password. Instead, the user stores an image file, which by itself cannot be used as a password. Rather, by comparing that image file with another image file (e.g., a master file at, for instance, the server) the password is determined and then can be authenticated.

In yet a further aspect of the present invention, a technique is provided for deploying one or more aspects of the authentication logic on one or more processing units. One embodiment of the deployment logic is described with reference to FIGS. 4A-4B.

Figure 4A:
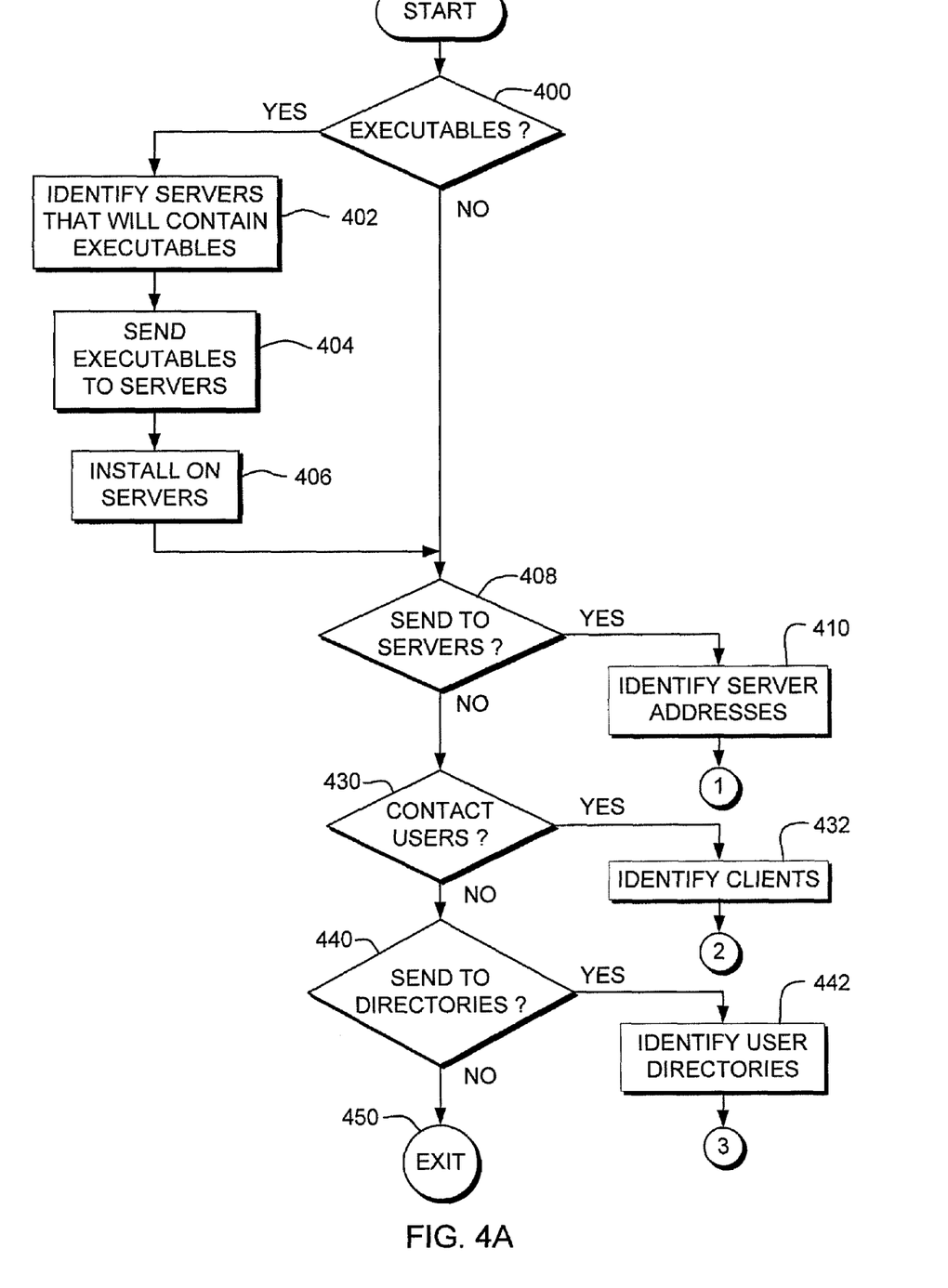
FIGS. 4A-4B depict one embodiment of the logic associated with deploying authentication logic on one or more processing units, in accordance with an aspect of the present invention.

Referring to FIG. 4A, initially, a determination is made as to whether there are any programs that are to reside on one or more servers when the authentication logic is executed, INQUIRY 400. If so, then the one or more servers to include the executables are identified, STEP 402, and the authentication logic for the one or more servers is transferred directly to the servers' storage via, for instance, a File Transfer Protocol (FTP) or some other protocol or by copying through the use of a shared file system, STEP 404. The logic is then installed on the servers, STEP 406.

Figure 4B:
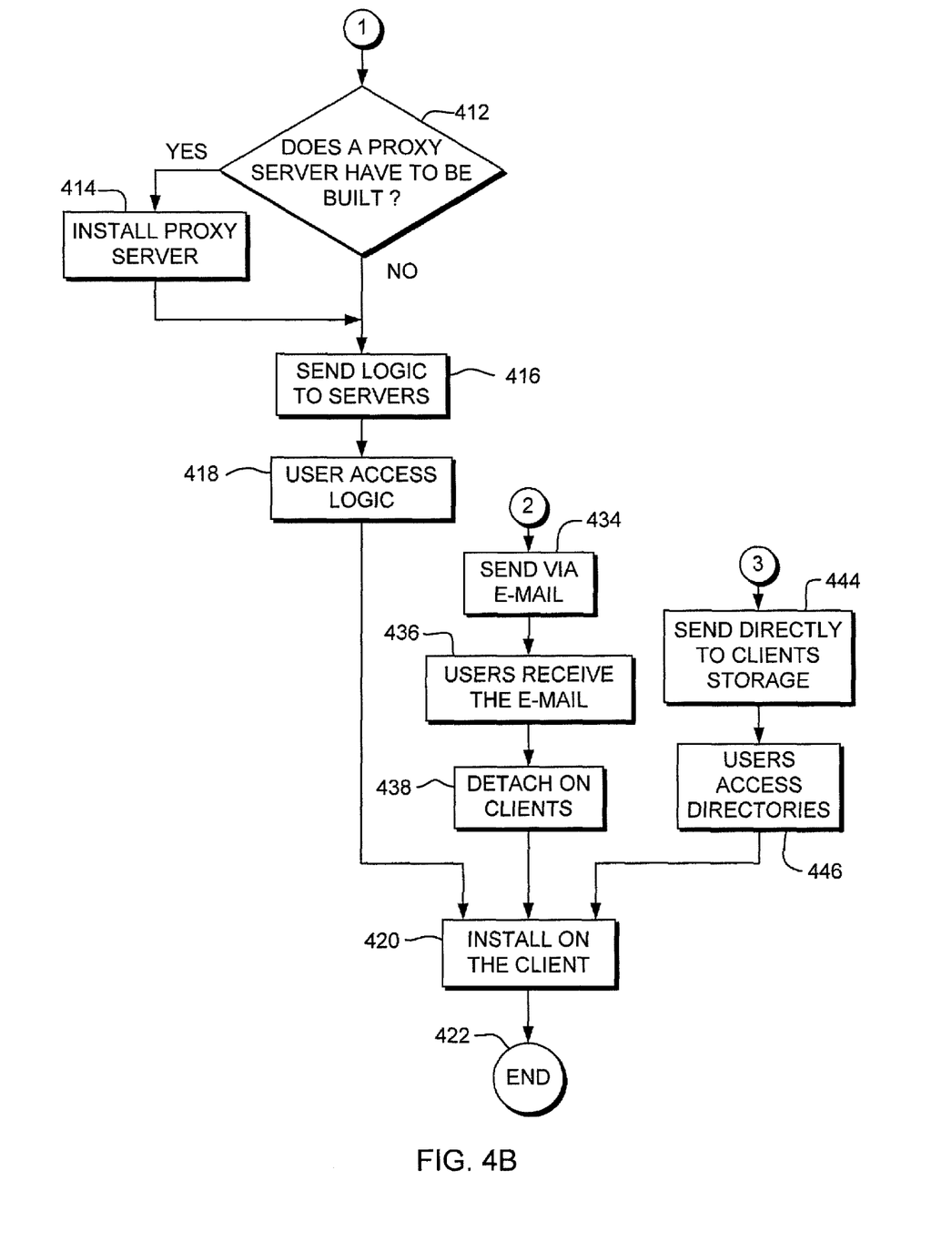

Thereafter, or if there are no executables, a further determination is made as to whether the authentication logic is to be deployed by having users access the logic on a server or servers, INQUIRY 408. If the users are to access the authentication logic on servers, then the server addresses that are to store the logic are identified, STEP 410. In one example, a determination is made as to whether a proxy server is to be built to store the authentication logic, INQUIRY 412 (FIG. 4B). A proxy server is the server that sits between a client application, such as a web browser, and a real server. It intercepts the requests to the real server to see if it can fulfill the request itself. If not, it forwards the request to the real server.

Two primary benefits of the proxy server are to improve performance and to filter requests. If a proxy server is to be built, then the proxy server is installed, STEP 414.

Thereafter, or if a proxy server is not to be built, the authentication logic is sent to the server either via a protocol, such as file transfer protocol (FTP), or it is copied directly from the source files to the server files via file sharing, STEP 416. As another example, a transaction is sent to the one or more servers that includes the authentication logic and the servers process the transaction, then receive and copy the logic to the servers' file systems.

After the authentication logic is stored at the servers, the users, via their client computers, access the logic on the servers and may copy at least a portion of the logic to their client computers' file systems, STEP 418. The user then executes the program that installs the logic on the client computer, STEP 420. In a further example, the servers automatically copy one or more aspects of the authentication logic to each client and then run the installation program for the logic at each client computer. This concludes one example of the deployment processing, STEP 422.

Returning to INQUIRY 408 (FIG. 4A), if the logic is not to be deployed by having users access the logic on one or more servers, then processing continues with a determination as to whether the logic is to be deployed by sending the logic to users via e-mail, INQUIRY 430. If so, the set of users where the logic is to be deployed is identified together with the addresses of the user client computers, STEP 432. The authentication logic is sent via e-mail to each of the user's client computers, STEP 434 (FIG. 4B). The users receive the e-mail, STEP 436, and detach the authentication logic from the e-mail to a directory on their client computers, STEP 438. The user executes the program that installs the logic on the client computer, STEP 420, and exits the process, STEP 422.

Returning to INQUIRY 430 (FIG. 4A), if the authentication logic is not to be deployed via e-mail, then a further determination is made as to whether the logic is to be sent directly to user directories on their client computers, STEP 440. If so, the user directories are identified, STEP 442. The authentication logic is directly transferred to the user's client computer directory, STEP 444 (FIG. 4B). This can be done in several ways, such as, but not limited to, sharing of the file system directories and then copying from the sender's file system to the recipient user's file system, or alternatively, using a transfer protocol, such as file transfer protocol (FTP). The users access the directories on their client file systems in preparation for installing the authentication logic, STEP 446. The user executes the program that installs the logic on the client computer, STEP 420, and exits the deployment process, STEP 422.

Returning to INQUIRY 440 (FIG. 4A), if the logic is not to be sent directly to the users' directories, then processing ends, STEP 450.

Although an embodiment of deploying logic is provided, many variations can be made without departing from the spirit of the present invention.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention, as described above. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 5:
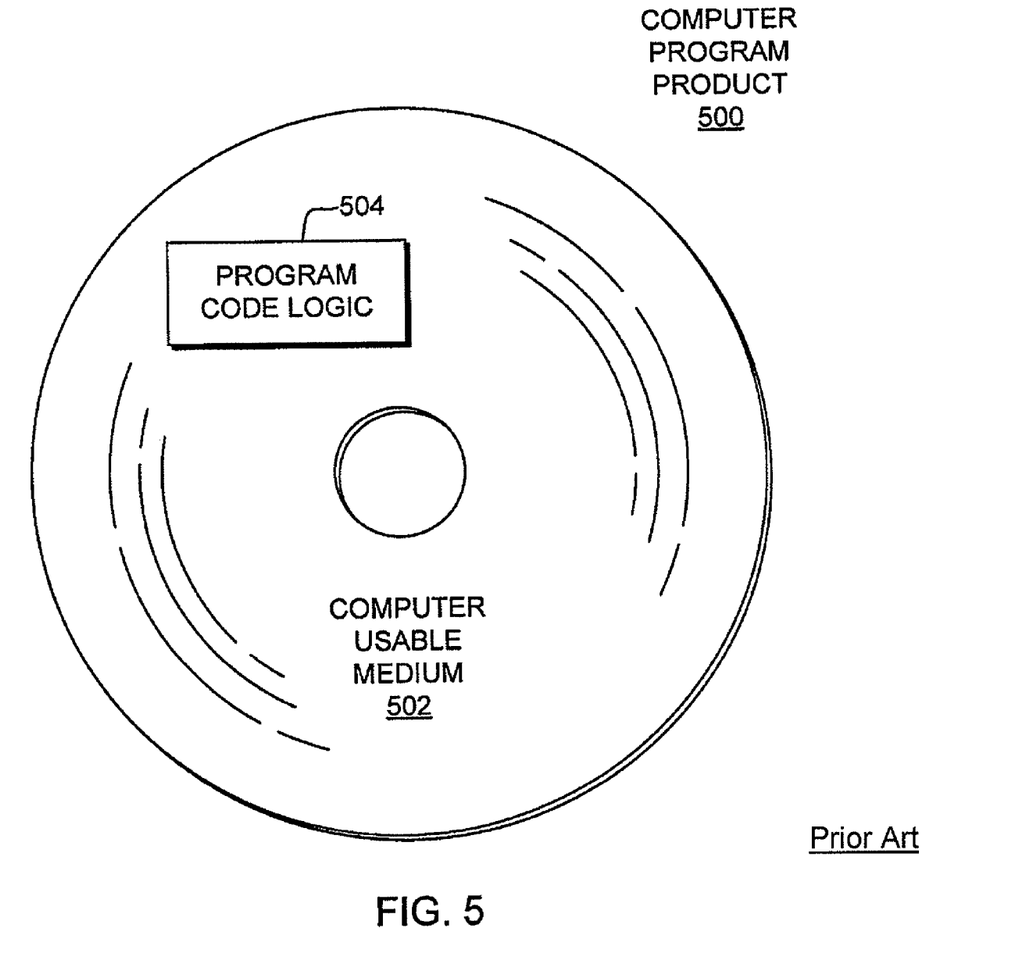
FIG. 5 depicts one embodiment of a computer program product incorporating one or more aspects of the present invention.

One example of an article of manufacture or a computer program product incorporating one or more aspects of the present invention is described with reference to FIG. 5. A computer program product 500 includes, for instance, one or more computer usable media 502 to store computer readable program code means or logic 504 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples. In further examples, a password can be created in other ways, including by other than concatenating. Further, the pixels making up the password can be randomly selected, such that the concatenation or other combining of the pixel bits are in an order different from the order in which the differences are found. Many other variations exist. Further, the image used by the user can be created in many different ways.

Moreover, the processing environments described herein are only examples of environments that may incorporate and use one or more aspects of the present invention. Environments may include other types of processing units or the components in each processing environment may be different than described herein. Each processing environment may include additional, less and/or different components than described herein. Again, these are only provided as examples.

Yet further, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to obtain instructions from memory and to optionally, provide local buffering for the obtained instruction; an instruction decode unit to receive the instruction fetched and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Although, in the above example, the password is ultimately created at the server, in a further embodiment, it can be created at the client in much the same way. That is, the password is created by comparing two (or more) images and finding the differences. The differences are used to create the password. Similarly, the password can be created by any processing unit in the same manner.

As used herein, obtaining an image includes, but is not limited to, receiving, having, being provided, retrieving, creating, being sent, being forwarded, etc. A processing unit is any type of device, structure, or hardware that uses a password. Further, a user to be authenticated includes, but is not limited to, authorizing the user and/or authorizing a communication sent by the user, etc.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of creating passwords, said method comprising:
    obtaining, by a processing unit, an image; and
    creating a password based on the obtained image, wherein the creating comprises:
        comparing, by the processing unit, the obtained image with another image to determine one or more random differences between the obtained image and the another image; and
        combining the one or more random differences determined from comparing the obtained image and the another image to create the password.

2. The method of claim 1, wherein the one or more random differences comprise one or more different pixels.

3. The method of claim 2, wherein the combining comprises concatenating bits representing the one or more different pixels in order of the differences.

4. The method of claim 1, wherein the one or more random differences are unknown to a user being authenticated by the password created based on the obtained image.

5. The method of claim 1, further comprising creating the image, the creating comprising:
    copying the another image to create a copied image; and
    changing one or more pixels of the copied image to provide the image.

6. The method of claim 5, wherein the changing comprises using a randomizing function to change the one or more pixels.

7. The method of claim 5, further comprising forwarding the image to a user for use in a communication being provided to the processing unit.

8. The method of claim 1, wherein the obtaining comprises receiving the image in a communication sent from a client.

9. The method of claim 1, wherein the password is unknown to a user being authenticated by the password.

10. The method of claim 1, further comprising validating, by the processing unit, the password to determine whether a communication including the obtained image is to be processed.

11. A method of deploying authentication logic on one or more processing units, said method comprising:
    installing authentication logic on at least one processing unit, the authentication logic to obtain an image and to create a password based on the obtained image, wherein to create the password, the obtained image is compared with another image, wherein the obtained image includes one or more random differences from the another image, and wherein the compare provides the one or more random differences as a password.

12. A system of creating passwords, said system comprising:
    at least one processing unit to:
        obtain an image; and
        create a password based on the obtained image, wherein to create the password, the at least one processing unit:

compares the obtained image with another image to determine one or more random differences between the obtained image and the another image; and combines the one or more random differences determined from comparing the obtained image and the another image to create the password.

13. The system of claim 12, wherein the one or more random differences comprise one or more different pixels.

14. The system of claim 13, wherein the combining comprises concatenating bits representing the one or more different pixels in order of the differences.

15. The system of claim 12, wherein at least one processing unit creates the image, the creating comprising:

copying the another image to create a copied image; and
changing one or more pixels of the copied image to provide the image.

16. The system of claim 15, wherein the changing comprises using a randomizing function to change the one or more pixels.

17. A computer program product for creating passwords, said computer program product comprising:

non-transitory computer readable storage medium readable by a processor and storing instructions for execution by the processor for performing a method comprising:

obtaining an image; and
creating a password based on the obtained image, wherein the creating comprises:

comparing the obtained image with another image to determine one or more random differences between the obtained image and the another image; and combining the one or more random differences determined from comparing the obtained image and the another image to create the password.

18. The computer program product of claim 17, wherein the one or more random differences comprise one or more different pixels.

19. The computer program product of claim 18, wherein the combining comprises concatenating bits representing the one or more different pixels in order of the differences.

20. The computer program product of claim 17, wherein the method further comprises creating the image, the creating comprising:

copying the another image to create a copied image; and
changing one or more pixels of the copied image to provide the image.

* * * * *